US011125925B2

(12) United States Patent
Kawakami et al.

(10) Patent No.: US 11,125,925 B2
(45) Date of Patent: Sep. 21, 2021

(54) OPTICAL ELEMENT

(71) Applicants: AUTOCLONING TECHNOLOGY, LTD., Sendai (JP); PHOTONIC LATTICE, INC., Sendai (JP); SOPHIA SCHOOL CORPORATION, Tokyo (JP); KEIO UNIVERSITY, Tokyo (JP)

(72) Inventors: Shojiro Kawakami, Sendai (JP); Takayuki Kawashima, Sendai (JP); Takafumi Chiba, Sendai (JP); Toshikazu Ijiro, Sendai (JP); Hiroyuki Tsuda, Yokohama (JP); Hiroshi Takahashi, Tokyo (JP)

(73) Assignees: Photonic Lattice, Inc., Miyagi (JP); Sophia School Corporation, Tokyo (JP); Keio University, Tokyo (JP)

( * ) Notice: Subject to any disclaimer, the term of this patent is extended or adjusted under 35 U.S.C. 154(b) by 466 days.

(21) Appl. No.: 16/081,913

(22) PCT Filed: Feb. 28, 2017

(86) PCT No.: PCT/JP2017/007958
§ 371 (c)(1),
(2) Date: Nov. 28, 2018

(87) PCT Pub. No.: WO2017/150568
PCT Pub. Date: Sep. 8, 2017

(65) Prior Publication Data
US 2019/0086597 A1      Mar. 21, 2019

(30) Foreign Application Priority Data
Mar. 2, 2016   (JP) .............................. JP2016-039854

(51) Int. Cl.
G02B 5/30   (2006.01)
G02B 1/00   (2006.01)
(Continued)

(52) U.S. Cl.
CPC .............. G02B 5/3083 (2013.01); G01J 4/04 (2013.01); G01N 21/21 (2013.01); G02B 1/002 (2013.01);
(Continued)

(58) Field of Classification Search
CPC ...... G02B 5/3083; G02B 1/005; G02B 1/002; G02B 1/02; G02B 5/1833; G02F 1/13363
(Continued)

(56) References Cited

U.S. PATENT DOCUMENTS

2004/0080805 A1*  4/2004  Levy ..................... G02F 1/0955
                                                                 359/280
2010/0091225 A1*  4/2010  Cho .................. G02F 1/133555
                                                                 349/105
2016/0025914 A1   1/2016  Brongersma et al.

FOREIGN PATENT DOCUMENTS

JP           3325825 B2   7/2002
JP      2010-164749 A    7/2010
(Continued)

OTHER PUBLICATIONS

International Search Report of International Patent Application No. PCT/JP2017/007958 completed May 17, 2017 and dated May 30, 2017 (4 pages).
(Continued)

Primary Examiner — Kristina M Deherrera
(74) Attorney, Agent, or Firm — Pyprus Pte Ltd; George D. Liu

(57) ABSTRACT

To provide a volume-type optical element in which a self-cloning photonic crystal is used. An optical element is
(Continued)

provided with half-wave plates of photonic crystals formed on the xy plane and laminated in the z-axis direction in a three-dimensional space x, y, z. The groove direction of the photonic crystals is a curved line, and the angle in relation to the y-axis direction changes continuously in the range of 0°-180°. Light entering the optical element in the axial direction is emitted from the optical element upon being divided and converted into clockwise circularly polarized light in the direction facing the x-axis by a given angle from the z-axis and anticlockwise circularly polarized light in the direction facing the −x-axis by a given angle from the z-axis. Laminating or placing a quarter-wave plate comprising a photonic crystal on one or both surfaces makes it possible to divide light entering from the z-axis direction of the optical element into two orthogonal linearly polarized lights.

7 Claims, 15 Drawing Sheets

(51) Int. Cl.
*G02B 1/02* (2006.01)
*G01J 4/04* (2006.01)
*G01N 21/21* (2006.01)
*G02B 5/18* (2006.01)

(52) U.S. Cl.
CPC .............. *G02B 1/005* (2013.01); *G02B 1/02* (2013.01); *G02B 5/1833* (2013.01)

(58) Field of Classification Search
USPC ........................................ 359/489.08, 489.07
See application file for complete search history.

(56) References Cited

FOREIGN PATENT DOCUMENTS

| | | |
|---|---|---|
| JP | 2012-159802 A | 8/2012 |
| JP | 2017-72526 A | 4/2017 |

OTHER PUBLICATIONS

Written Opinion of International Patent Application No. PCT/JP2017/007958 completed May 17, 2017 and dated May 30, 2017 (4 pages).
D Lin et al, "Dielectric gradient metasurface optical elements", Jul. 2014.
N. Yu et al,"Flat optics with designer metasurfaces", Jan. 2014.

* cited by examiner

FIG. 2
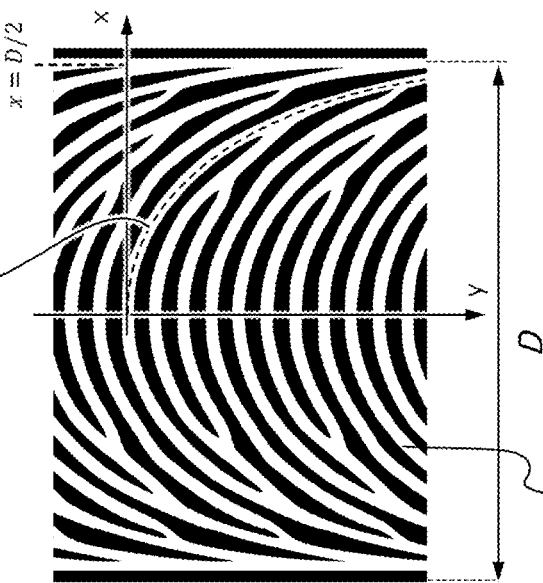
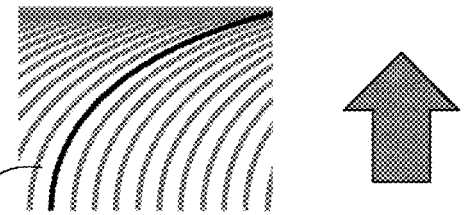
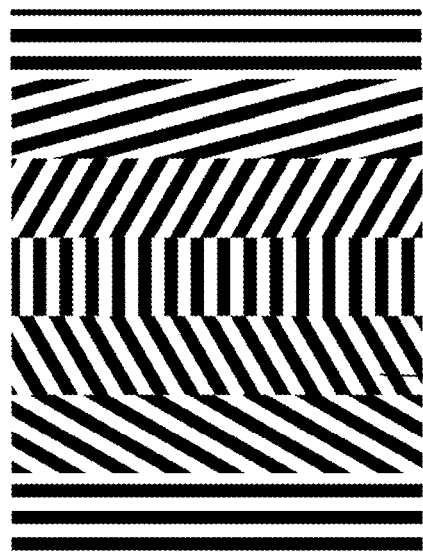

SENSITIVITY OF RETARDANCE WITH RESPECT TO PITCH IN CASE OF PHOTONIC CRYSTAL

FIG. 6
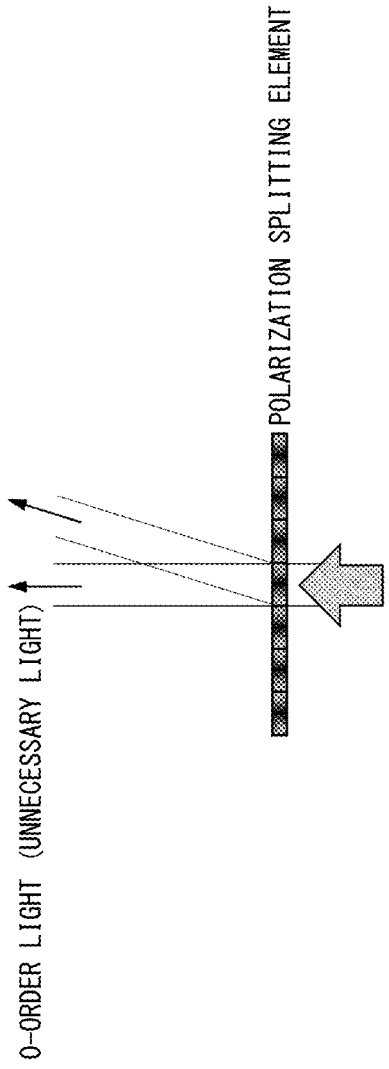
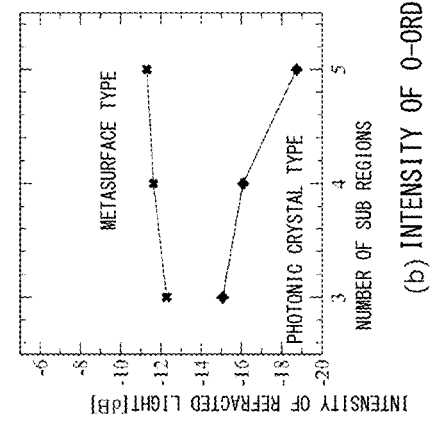
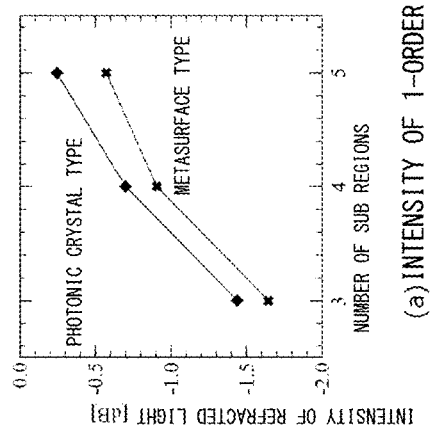

VIEW ILLUSTRATING OPTICAL ELEMENT ACCORDING TO SECOND EMBODIMENT

FIG. 9  OPTICAL CHARACTERISTICS ACTUAL MEASUREMENT VALUE OF POLARIZATION PRISM: INTENSITY OF 0-ORDER LIGHT

FIG. 15 COUPLING EFFICIENCY OF LENS AND FOCUS PART

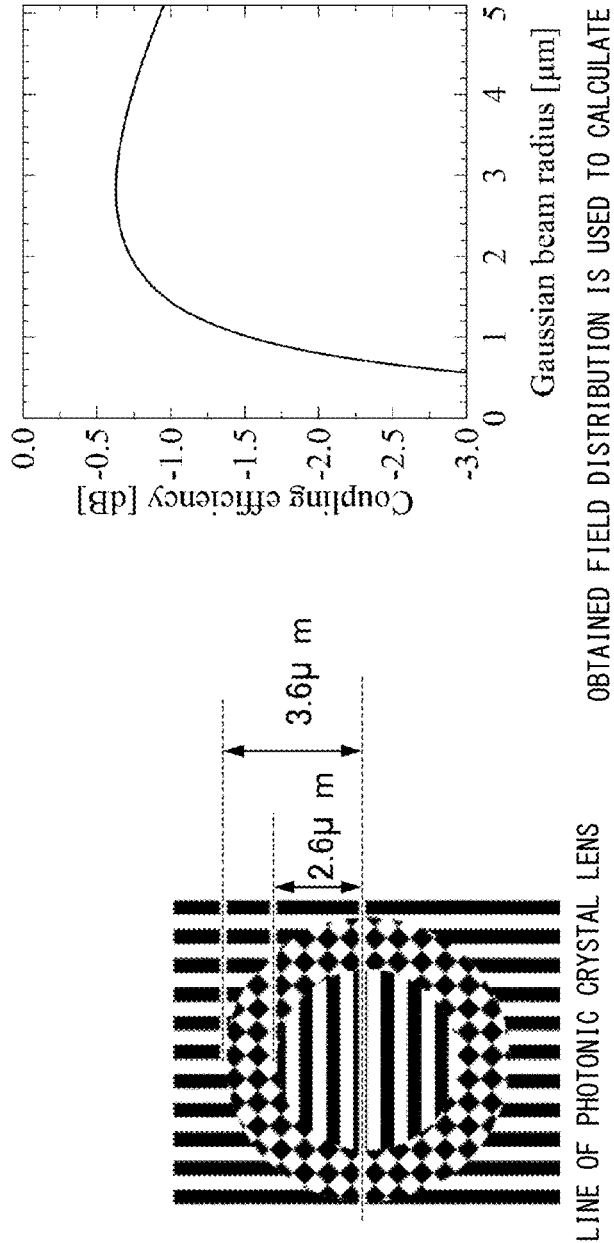

OUTLINE OF PHOTONIC CRYSTAL LENS

· LENS THICKNESS 4.8μm
· EFFECTIVE REFRACTIVE INDICES ARE 2.713, 2.600 AND 2.486 FROM CENTER PART

OBTAINED FIELD DISTRIBUTION IS USED TO CALCULATE COUPLING EFFICIENCY OF GAUSSIAN BEAM HAVING ARBITRARY RADIUS. GRAPH SHOWS CALCULATION RESULT WHICH TAKES INTO ACCOUNT LOSS (0.25 dB) CAUSED AT PRISM PORTION, TOO.

GAUSSIAN BEAM RADIUS 1.5μm → 0.95dB

OPTICAL ELEMENT

TECHNICAL FIELD

The present invention relates to an optical element which causes an action such as refraction, splitting and condensation of light.

BACKGROUND ART

Lenses and prisms are very widely put into practical use for optical elements which realize refraction, polarization and splitting and condensation of light. Most of these optical elements have stereoscopic shapes such as convex lenses and concave lenses and are each manufactured to have one function. Therefore, integration and miniaturization are usually accompanied by difficulties. In recent years, a technique (referred to as a gradient metasurface) of performing fine machining on a surface of a transparent substrate, changing a phase per place of a vertically transmitting light beam, inclining a wavefront, and controlling propagation after transmission is developing.

It is common that a necessary deformation amount of the wavefront in this case is several times to several tens of times as the wavelength. On the other hand, a practically usable phase shift of light passing the surface is approximately between a fraction of a $2\pi$ radian to several times. Therefore, it is necessary to perform an operation of returning the phase shift to zero in a form of a sawtooth wave per $2\pi$ radian.

The above operation of returning the phase shift to zero in the form of the sawtooth wave per $2\pi$ radian inevitably causes diffusion of light near a discontinuous point of the phase shift, and an error of an amplitude and a phase accompanying the diffusion.

Following means is known as a method for reducing the diffusion and the error
(Non Patent Literature 1).

That is, (A) Micro ½ wavelength plates having various azimuth directions per region are disposed without a gap on the surface of the substrate.

(B) A property that a phase transition caused when circularly polarized light passes this region is equal to a phase transition which is two times as an angle θ formed by a principal axis with respect to a reference direction.

More specifically, it is known that, when an electric field of entering light in FIG. 1 is circularly polarized light expressed by, for example, $E_x = E_0 \cos(\omega t)$ and $E_y = E_0 \sin(\omega t)$, if a ½ wavelength plate which adopts ξη axis as in FIG. 1 and has the principal axis in ξη axis direction, light after transmission is counterclockwise circularly polarized light, and a relative phase shift by 2θ (Non Patent Literature 1).

When the phase transition needs to be changed continuously over $2\pi$, for example, θ may be defined as in an upper part of FIG. 1, and θ may be changed continuously over $\pi$. By changing θ several continuously and monotonically several times as $\pi$, a phase angle can be changed any number of times as $2\pi$ without discontinuity. If θ approximately increases or decreases linear together with x, the wavefront of the transmitting circularly polarized light is linearly converted relative to x, and a prism effect occurs.

The necessary "micro ½ wavelength plates having various azimuth directions per region" are realized by periodically aligning deep grooves on a substrate. A groove column periodically formed on a surface of a solid body and having an infinite length causes more significant phase delay with respect to polarized light whose electric field is parallel to the grooves than polarized light whose electric field is vertical to the grooves. A half wavelength plate requires that the phase difference matches with $\pi$, and, due to design or fabrication process, the interval between a groove and another is usually approximately a ⅓ wavelength to a ½ wavelength, and does not become a ¼ wavelength.

CITATION LIST

Non Patent Literature

Non Patent Literature 1: D. Lin, P. Fan, E. Hasman and M. Brongersma, "Dielectric gradient metasurface optical elements, Science, Applied Optics, 18 Jul. 2014, pp. 298 to 302.

Non Patent Literature 2: N. Yu and F. Capasso, "Flat optics with designer metasurfaces", Nature materials, 23 Jan. 2014, pp. 139 to 149.

Patent Literature

Patent Literature 1: JP 3325825 B1 "THREE-DIMENSIONAL PERIODICAL STRUCTURE, ITS MANUFACTURING METHOD, AND METHOD OF MANUFACTURING FILM"

SUMMARY OF INVENTION

Technical Problem

The above-described method for using a ½ wavelength plate for surface treatment has following difficulties.

(1) The interval between a groove and another or the period of periodic grooves is at least a ⅓ wavelength or more. The phase needs to be controlled precisely per place to control a light beam, yet is limited by the groove interval of the wavelength plate. In order that the grooves actually function as the wavelength plate and have a different principal axis direction from that of a neighboring region in the first place, the length of the groove needs to be at least equal or more than and desirably two times or more than the interval between the grooves. The dimension of a micro region cannot be sufficiently small. This will be described below. A region having a minimum groove length among each region D in FIG. 1 will be assigned symbol d. Similarly, symbol d is also defined likewise in FIG. 5, too. Furthermore, a periodically repeated groove period (also referred to as an "inter-groove unit period") is represented by symbol p. d/p needs to be larger to some degree for the half wavelength plate to operate. When d/p is finite, the phase difference due to birefringence of this region is smaller than $\pi$, and is estimated as approximately $\pi(1- p/2 d)$. In order that the phase difference which needs to be originally $\pi$ is 0.95 $\pi$ or more, 0.9 $\pi$ or more, 0.75 $\pi$ or more, or 0.5 $\pi$ or more, d needs to be 10p or more, 5p or more, 2p or more or p or more, respectively.

By contrast, d needs to be kept smaller for higher definition. In prisms in FIGS. 1 and 5, an upper limit of d is determined by a request for an element, and, as d can be made smaller, the element capability becomes higher (because the quantization error is small). On the other hand, p is demanded to be one digit or half digit smaller than d, and therefore a greater advantage can be obtained by making p smaller.

Furthermore, when the grooves are curves as in FIG. 2, if the same curves are aligned at equal pitches, as the curves become closer to vertical lines, the pitches narrow, and the pitches need to be kept by decreasing (puncturing) the number of grooves. Even in this case, the pitch interval cannot be strictly kept as fixed intervals, and the pitch interval fluctuates per place and the phase difference shifts from the half wavelength plate.

(2) An anti-refection layer needs to be formed on an element surface to prevent reflection of unnecessary light on the element surface. However, the ½ wavelength plate makes it difficult to form the film by surface treatment.

(3) An element which performs a predetermined operation with respect to circularly polarized light is hard to use as a normal light industrial member and is desired to operate with respect to linearly polarized light. To meet this request, ¼ wavelength plates need to be placed on front and back sides of the element to sandwich it, which is bothersome. What is the easiest to use is the ¼ wavelength plates which can be integrated on front and back sides of the element in which micro regions are laid.

Hence, the present invention has been made in light of these problems. The object of the present invention is to provide a volume type optical element which uses autocloned photonic crystal instead of a metasurface.

To sum up this effect in advance, firstly, discontinuity caused by pattern mismatch and puncturing at a sub region boundary can average and smooth an influence on light by refraction accompanied by propagation in a Z direction (FIGS. 6 and 9).

Secondly, even when a curved shape or puncturing makes an inter-line pitch uneven and non-uniform, the uniformity of the phase difference between beams of polarized light is retained (FIG. 3).

Thirdly, polarization purity is retained by integrating a photonic crystal prism and a photonic crystal lens (FIG. 14) as in a fourth embodiment described below.

Solution to Problem

The main object of the present invention is to use a wavelength plate made of autocloned photonic crystal under a design condition that an interval between the grooves, i.e., a basic period is sufficiently smaller than the wavelength being used.

A first aspect of the present invention relates to an optical element. An optical element includes a half wavelength plate of photonic crystal which is formed on an xy plane and is stacked in a z axis direction in a three-dimensional space x, y and z. The optical element includes one or a plurality of single or repeated regions in an x axis direction, and the regions are partitioned into a plurality of sub regions of belt-like shapes in the x axis direction. In a groove direction of the photonic crystal, an angle with respect to the y axis direction changes stepwise in a range of 0° to 180° in the region, and the angle with respect to the y axis direction is uniform in the sub region. Furthermore, the optical element splits and converts light entering in the z axis direction into right-handed circularly polarized light in a direction which travels toward the x axis by a certain angle from the z axis, and left-handed circularly polarized light in a direction which travels toward the −x axis by the same angle as the certain angle from the z axis to emit.

Another embodiment of the optical element will be described. An optical element includes a half wavelength plate of photonic crystal which is formed on an xy plane and is stacked in a z axis direction in a three-dimensional space x, y and z. The optical element includes one or a plurality of single or repeated regions in an x axis direction. The groove direction of the photonic crystal is a curve, and an angle with respect to the y axis direction continuously changes within a range of 0° to 180°. Furthermore, the optical element splits and converts light entering in the z axis direction into right-handed circularly polarized light in a direction which travels toward the x axis by the same angle as the said certain angle from the z axis, and left-handed circularly polarized light in a direction which travels toward the −x axis by a certain angle from the z axis to emit.

In the optical element having the above-mentioned curved type grooves, preferably, a neighboring protrusion part and recess part are geometrically disposed such that a ratio of a maximum value and a minimum value inside the region having an interval of first one of the neighboring protrusion part and recess part is four times or less, and second one of the neighboring protrusion part and recess part branches and joins (see FIG. 2).

In the optical element having the above-mentioned curved type grooves, preferably, when a width of the region is D, the curve is expressed by $y=(D/\pi)\log(\cos(\pi x/D))+a$ constant.

In the optical element according to the present invention, preferably, an inter-groove unit period of the photonic crystal is 40 nm or more and is ¼ or less than a wavelength of the entering light, and a period in a thickness direction is ¼ or less than the wavelength of the entering light.

In the optical element according to the present invention, preferably, a ¼ wavelength plate made of the photonic crystal is stacked or disposed on a single surface or both surfaces, and light entering from the z axis direction of the optical element is split into two beams of orthogonal linearly polarized light.

A second aspect of the present invention relates to a composite optical element. A composite optical element includes at least two or more of the above optical elements. The two optical elements are referred to as a first optical element and a second optical element, respectively. The first optical element and the second optical element are disposed at an interval of a certain propagation length. A ¼ wavelength plate is provided at a stage subsequent to the second optical element. A pair of lenses is provided at a stage subsequent to the ¼ wavelength plate and has a function of condensing linearly polarized light and diffusing linearly polarized light orthogonal to the linearly polarized light. The composite optical element includes these first and second optical elements, ¼ wavelength plates and lens, and consequently can split light entering from the side of the first optical element into two linearly polarized light components to condense.

More specifically, the first aspect of the present invention relates to the optical element. The optical element according to the present invention is a wavelength plate (division type) whose principal axis azimuth direction differs per region or a wavelength plate (curved type) whose principal axis azimuth direction continuously changes. The wavelength plates in the respective regions are made of photonic crystal which adopts a periodic structure in a plane and whose periodic structure is stacked in the thickness direction. The photonic crystal needs to be formed by autocloning method (see Patent Literature 1).

An inter-groove unit period of the intra-plane periodic structure which forms each wavelength plate, and a unit period in the thickness direction of each wavelength plate are both ¼ or less than the wavelength of light entering the optical element. In addition, the inter-groove unit period of the intra-plane periodic structure is preferably 40 nm or more. In addition, the wavelength of the light entering the optical element is assumed to be generally selected from 400 nm to 1800 nm.

Furthermore, an intra-plane minimum value of a wavelength plate groove length among wavelength plates in a plurality of regions is the inter-groove unit period or more. In addition, an upper limit of the intra-plane minimum value of the wavelength plate groove length is preferably 50 times or less than an inter-groove unit period p.

Furthermore, in a case of a wavelength plate (curved type) whose principal axis azimuth direction continuously changes, a protrusion part and a recess part are preferably disposed geometrically such that, when a pitch p of the protrusion part (a pitch in a case where a pattern is linear) is $p_0$, p is within $0.5 \cdot p_0 \leq p \leq 2 \cdot p_0$ and the protrusion part or the recess part branches or joins. As illustrated in FIG. 3, according to the autocloned photonic crystal, a change in a phase difference fluctuates less than pitch fluctuation. Consequently, a phase shift from the half wavelength plate in a case where the pitch changes can be decreased.

A preferred embodiment of the optical element according to the present invention is an optical element which operates with respect to entering predetermined circularly polarized light. According to this optical element, each region is a ½ wavelength plate, and an angle with respect to the reference direction of this principal axis is ½ as a phase change amount which needs to be given in each region.

According to the preferred embodiment of the optical element according to the present invention, the first uniform ¼ wavelength plate made of photonic crystal, the above-described optical element (wavefront transformer element) and the second uniform ¼ wavelength plate made of the photonic crystal are stacked in this order on a transparent substrate. Principal axis azimuth directions of the first ¼ wavelength plate and the second ¼ wavelength plate preferably differ by 90°.

According to the optical element of the present invention, an autocloned photonic crystal wavelength plate has a fundamentally different volume shape from the gradient metasurface (e.g., Non Patent Literatures 1 and 2: gradient metasurface). Consequently, it is possible to easily perform reflection prevention processing on a surface and a lower part of the optical element and to use an adhesive. In a case of the volume shape, it is possible to achieve higher definition of the structure because the characteristics are kept substantially constant even when the number of stacked layers is increased and a stacking period and an intra-plane period are made small while the entire thickness of the stacked layers is maintained.

According to another preferred embodiment of the optical element of the present invention, the wavelength plate in each region formed by parallel lines of determined pitches is changed from the parallel lines to curves to remove a region (sub region) boundary. By changing the parallel lines to the curves, a quantization error becomes small, and as a result it is possible to reduce the phase error, reduce the ratio of an unnecessary polarized wave and reduce the rate of components which are not branched.

Furthermore, a structure which sandwiches both sides of a multi-region ½ wavelength plate by two uniform ¼ wavelength plates can be also made by a consistent film formation process, and consequently is advantageous in terms of miniaturization.

Furthermore, the optical element which can remove an unnecessary polarized wave by using the multi-region ½ wavelength plate, branching input light, inputting each light to a region division type ¼ wavelength plate, converting each light into linearly polarized light of the same azimuth direction, inputting the linearly polarized light to a photonic crystal lens, and condensing the linearly polarized light can be created by the consistent film formation processing.

Advantageous Effects of Invention

It is possible to prevent occurrence of light diffusion and unnecessary light components deriving from higher definition of a structure and discontinuity due to curving. Furthermore, it is possible to provide good machinability such as surface treatment, cleaning and adhesion processing, and reduce a volume, a footprint and manufacturing cost of parts.

BRIEF DESCRIPTION OF DRAWINGS

FIG. 2 illustrates a view illustrating a division type (parallel grooves) and a curved type.

FIG. 6 illustrates a view illustrating comparison between a metasurface type of the conventional technique and a photonic crystal type according to the first embodiment.

FIG. 15 illustrates a view illustrating a lens part of the composite optical element according to the fourth embodiment, and coupling efficiency.

DESCRIPTION OF EMBODIMENTS

Following first embodiment, second embodiment, third embodiment and fourth embodiment according to the present invention will be described.

First Embodiment

[Polarization Splitter Element (Polarization Grating)]

In a free space, a following change in a phase needs to be given to a light beam to make a wave traveling in parallel to a z axis enter a prism and refract the wave at an angle α in an xz plane. A phase difference $2\pi \sin \alpha \cdot x/\lambda$ from x=0 needs to be provided at x=D in FIG. 1, and a principal axis of a half wavelength plate needs to have a gradient of $\pi \sin \alpha/\lambda$ with respect to an x axis according to the above principal (λ is a light wavelength).

A design example in a case where the wavelength is 1550 nm will be described with reference to FIGS. 4(a), (b) and (c).

Figure 4:
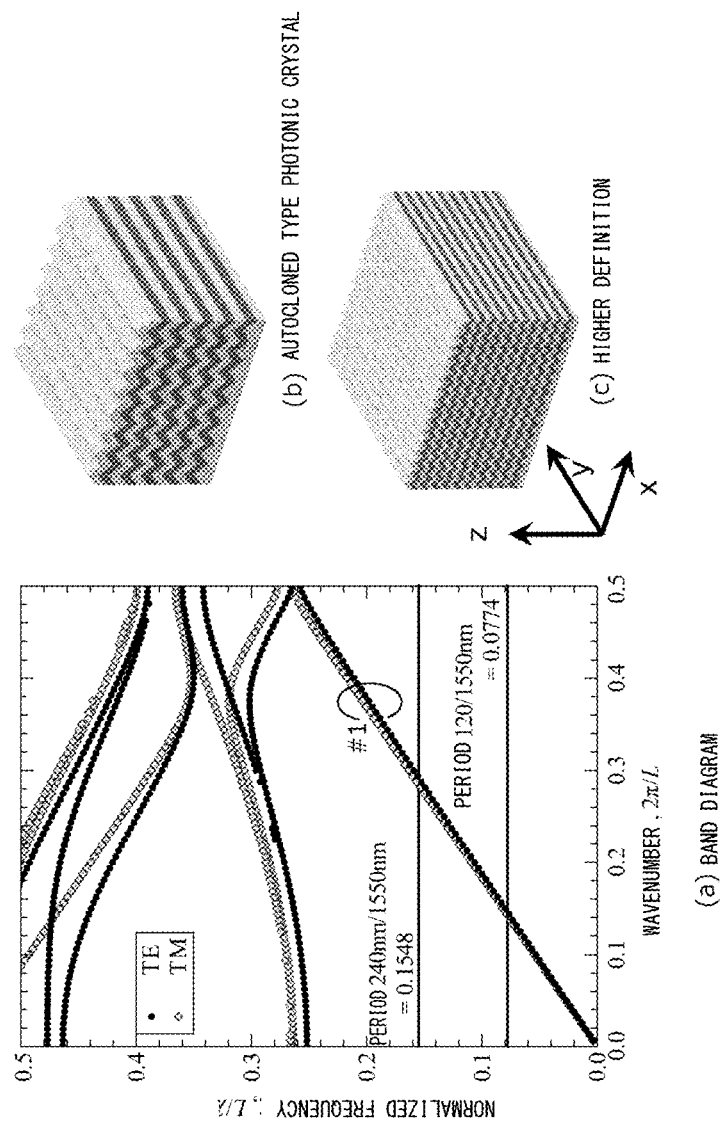
FIG. 4 illustrates a band diagram of the photonic crystal and a view illustrating photonic crystal having higher definition.

FIG. 4(a) is referred to as a band diagram of a periodic structure or a propagation characteristics diagram, and illustrates a dispersion curve indicating a phase difference (wave number) per unit length in a traveling direction of light penetrating in a z direction vertical to the plane, in relation to a normalized frequency proportional to a reciprocal of the wavelength. L represents a basic period (a sum of the thicknesses of two types of transparent bodies) in the z direction.

FIG. 4(b) illustrates a typical structure of photonic crystal used in an optical communication wavelength band.

Various elements of the photonic crystal include a high refractive index material $Nb_2O_5$ the thickness 120 nm, a low refractive index material $SiO_2$ the thickness 120 nm, a period in an x direction 500 nm, a slow-axis refractive index 1.886, a fast-axis refractive index 1.837, and the thickness of entire stacked layers of a ½ wavelength plate 15.8 μm.

FIG. 4(c) illustrates a design example for higher definition, and materials are common.

Dimensions of the photonic crystal include a high refractive index material $Nb_2O_5$ the thickness 60 nm, a low refractive index material $SiO_2$ the thickness 60 nm, and a period in the x direction 250 nm which is half of those in FIG. 2(b), and a slow-axis refractive index 1.878, a fast-axis refractive index 1.841, and the thickness of entire stacked layers of a ½ wavelength plate 20.9 μm.

Characteristics in FIGS. 4(b) and 4(c) are commonly indicated by a dispersion relationship (or the band diagram) in FIG. 4(a). How to use the dispersion relationship will be described. A TE first band (black circles) and a TM first band (white circles) are indicated by #1 in FIG. 4(a). These bands are illustrated as substantially straight lines when the normalized frequency L/λ is 0 or more and 0.24 or less. This means that effective refractive indices of a TE wave and a TM wave at, for example, the normalized frequency=0.1548 (an upper dotted line) substantially match with effective refractive indices of a TE wave and a TM wave at a half normalized frequency=0.0774 (lower dotted line). Consequently, even when a structure is arbitrarily reduced (2:1 in this example) while a homothetic ratio is kept, a substantially equal property (e.g., birefringence) can be obtained as a medium. By reducing a unit period of a solid body while keeping the homothetic ratio, it is possible to arbitrarily realize higher definition. An autocloning method has been found to be able to make photonic crystal even when p is a very small value, currently has been achieved up to p=80 nm and up to p=40 nm is available when less than 80 nm.

Figure 1:
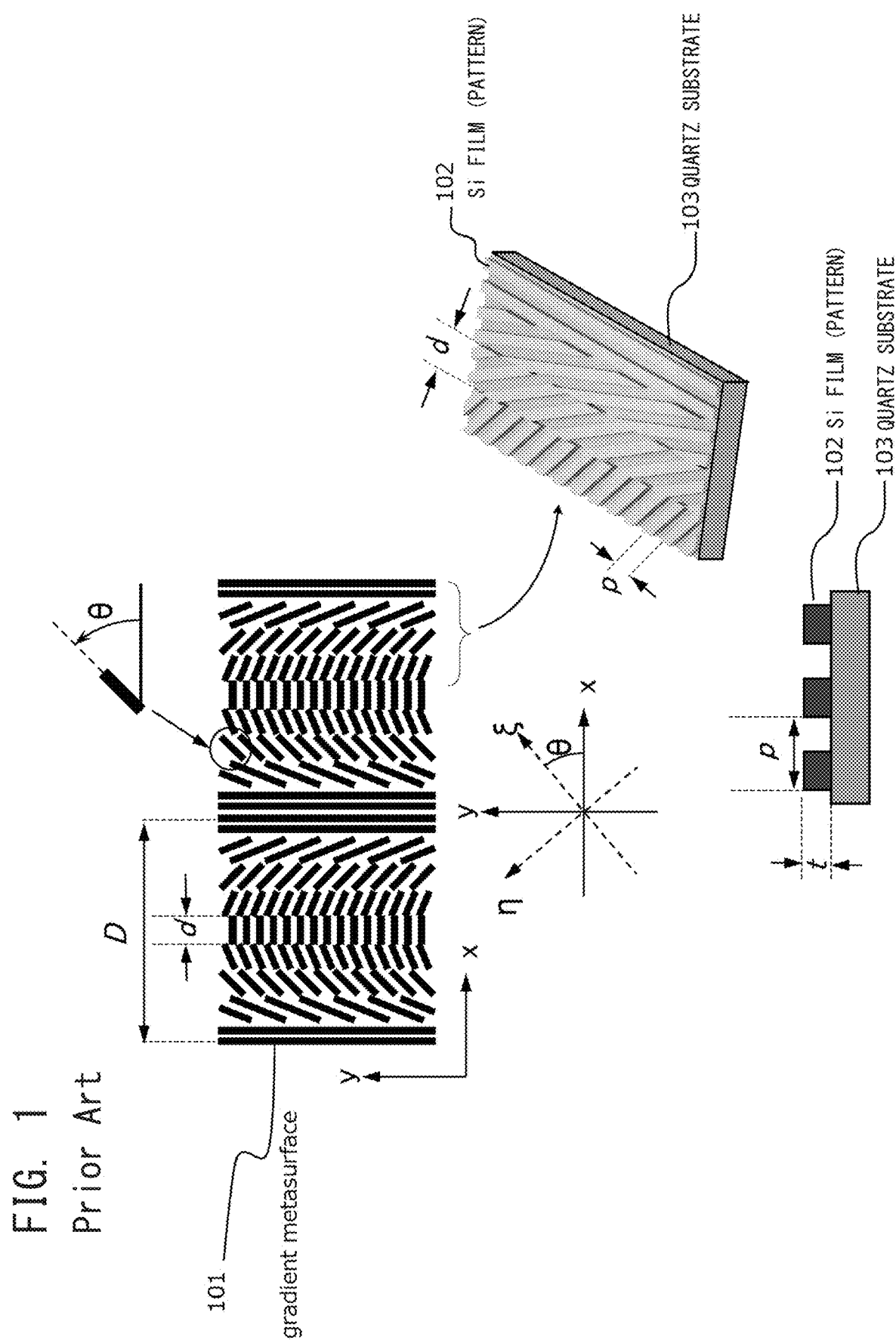
FIG. 1 illustrates polarization grating realized by using a gradient metasurface which is a conventional technique.
Figure 5:
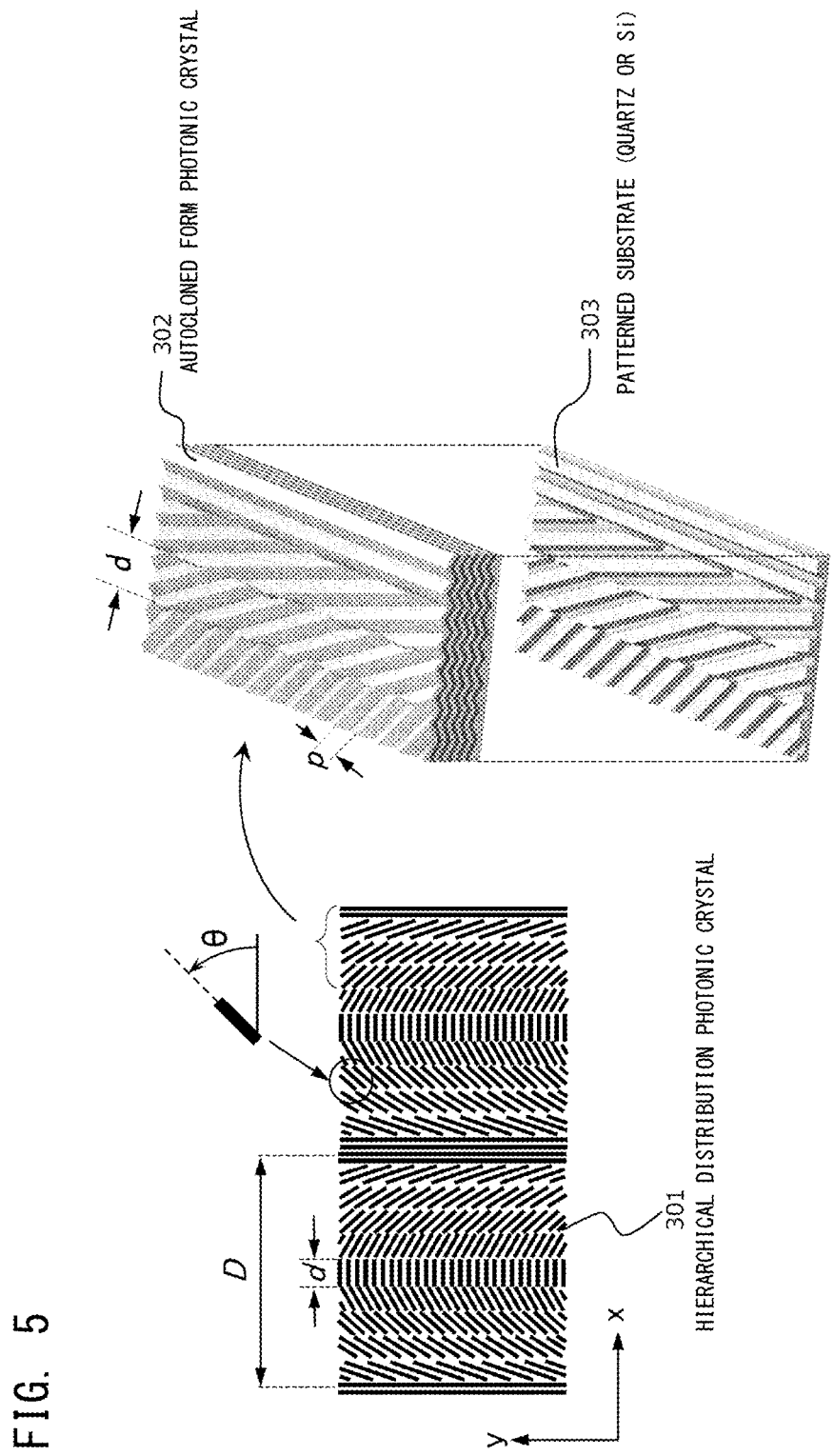
FIG. 5 illustrates a view illustrating an example of an optical element (division type) according to a first embodiment.

FIG. 5 is a surface view of a hierarchical distribution phase plate prism which is formed by high definition autocloned photonic crystal as illustrated in FIG. 4(c), and is different from a known metasurface phase plate illustrated in FIG. 1. The photonic crystal phase plate prism in FIG. 5 has a surface shape which is qualitatively similar to that in FIG. 1, yet is a substantially volume type high definition photonic crystal which is new and therefore requires attention. A difference is that, while the phase surface is converted when light passes the surface in FIG. 1, a phase surface changes while a wave propagates in the volume in FIG. 5.

Compared to a preceding example in FIG. 1, the photonic crystal phase plate prism in FIG. 5:

has a greater number of sub regions (the number of tones in the principal axis azimuth direction) in one period in the x direction, and can more correctly reproduce a target phase distribution; and has a higher ratio of the width of each sub region and an interval between the grooves of the photonic crystal (an interval between black bold lines and between white bold lines in FIG. 5), and therefore more accurately realizes anisotropy.

In view of the above, higher definition is achieved.

In FIG. 5, when θ linearly increases or decreases together with x in terms of approximation, this element has a prism effect. Consequently, by enhancing precision of the wavefront by higher definition, accuracy of an amplitude distribution and a phase distribution of transmission light realized by the prism is remarkably improved.

In addition, in this structure, when the wavelength is λ and the width of a region is D, one circularly polarized light is refracted at a refraction angle λ/D radian, and the other circularly polarized light is refracted at a refraction angle λ/D radian in an opposite direction, and therefore a split angle is a 2λ/D radian. When approximately 10 wavelengths are selected as D, the split angle is approximately 12 degrees and is remarkably approximately two times higher than the split angle by natural crystal rutile, and therefore is useful for miniaturization of optical devices.

FIG. 5 illustrates the structure of the autocloned high definition photonic crystal. This photonic crystal is formed by alternately stacking two types of transparent media of different refractive indices in the z direction on a substrate 303 having recesses and protrusions of a periodic pattern on an xy plane in the three-dimensional space x, y and z. The two types of transparent media have recess and protrusion structures which fit the recesses and protrusions of the substrate 303.

A plurality of types of transparent bodies which form the autocloned photonic crystal are preferably one of amorphous silicon, niobium pentoxide, tantalum pentoxide, titanium oxide, hafnium oxide, silicon dioxide, aluminum oxide and a fluoride such as magnesium fluoride. Two or a plurality of types having different refractive indices can be selected from these materials, and can be used for the photonic crystal. For example, combinations of amorphous silicon and silicon dioxide, niobium pentoxide and silicon dioxide, and tantalum pentoxide and silicon dioxide are desirable, yet other combinations are also possible. More specifically, the autocloned photonic crystal adopts a structure formed by alternately stacking a high refractive index material and a low refractive index material in the z direction. The high refractive index material is preferably tantalum pentoxide, niobium pentoxide, amorphous silicon, titanium oxide, hafnium oxide, or a combination of these two or more types of materials. The low refractive index material is preferably silicon dioxide, aluminum oxide, the fluoride such as magnesium fluoride or a combination of these two or more types of materials.

As illustrated in FIG. 5, a plurality of regions D is periodically repeatedly formed toward at least an x axis direction in the xy plane. The lengths in the x axis direction of a plurality of regions D are preferably equal. Furthermore, each region D is further partitioned into a plurality of sub regions in the x direction. In the example illustrated in FIG. 5, each D is partitioned into 11 sub regions, yet may be divided into 11 or more regions and is preferably divided by odd numbers such as 13, 15, 17 and 19. Each sub region included in each region D preferably has the substantially equal width in the x direction. The "substantially equal width" means to permit an error of ±2% based on the width of the sub region located at the center in the x direction.

Furthermore, a plurality of grooves is periodically formed in each sub region. The width of every groove is substantially equal. Furthermore, each groove is formed from an end to an end in the x direction in each sub region. In the sub region located at the center in the x direction in the region D, grooves extending in parallel to the x axis direction are repeatedly formed periodically in a y direction. On the other hand, in the sub regions located on both left and right ends in the x direction in the region D, grooves extending in parallel to the y direction are formed. Hence, angles $\theta$ formed by the grooves formed in the both left and right end sub regions with respect to the groove formed in the center sub region are 90 degrees. The groove lengths in these sub regions are maximum, and match with an effective dimension in the y direction of the entire element.

Furthermore, four sub regions are located on each of the left and right sides between the center sub region and the both left and right end sub regions. Furthermore, a plurality of grooves is periodically repeatedly formed in the y direction in each sub region located between these sub regions as well. Furthermore, an angle of every groove formed in a certain sub region is equal. In this regard, the angle $\theta$ of each groove of each sub region located in-between is set to gradually become closer to 90 degrees from the center region toward the both left and right end sub regions. When, for example, the four sub regions are provided between the center sub region and the both left and right end sub regions, and the angles of the grooves of the center sub region are 0 degree, and the angles of the grooves of the both left and right end sub regions are 90 degrees, an inclination angle $\theta$ becomes steep by 22.5 degrees at a time in order from a region closer to the center sub region. Thus, each region D is partitioned into a plurality of sub regions of the equal widths in the x direction, the grooves of the equal angles are periodically formed in each sub region, and the angles of the grooves monotonically increase from the sub region located at the center in the x direction toward the sub regions located at the both left and right ends.

Under these presumptions, the inter-groove unit period p (see FIG. 1) of the periodic structure in each sub region is ¼ or less than the wavelength (which is selected from 400 nm or 1800 nm, for example) of entering light. In addition, a lower limit value of the inter-groove unit period p is 40 nm. Furthermore, unit periods of the two types of transparent media of different refractive indices are also ¼ or less than the wavelength of light in the thickness direction (z direction). In addition, a lower limit value of the unit period in the thickness direction is 40 nm. Furthermore, an intra-plane minimum value d (see FIG. 5) of the groove length among the entirety of a plurality of regions D is one time or more as the above inter-groove unit period p. In addition, an upper limit value of the intra-plane minimum value d of the groove length is 50 times as the above inter-groove unit period p. As illustrated in FIG. 5, all of the widths in the x direction of a plurality of sub regions formed in the certain region D are equal, therefore, the intra-plane minimum value d of the groove length in the region D is basically the groove length formed in the sub region located at the center of this region D. In addition, the groove lengths of grooves in regions close to both left and right sides in the x direction tend to become longer.

Thus, the high definition photonic crystal illustrated in FIG. 5 has a larger number of sub regions (the number of tones in the principal axis azimuth direction) in one period in the x direction compared to the example in FIG. 1, and can more accurately reproduce a target phase distribution. Furthermore, the high definition photonic crystal has a higher ratio of the width of each sub region and an interval between the grooves of the photonic crystal (an interval between black bold lines and between white bold lines in FIG. 5), and therefore more accurately realizes anisotropy. In view of this, the photonic crystal illustrated in FIG. 5 has higher definition.

FIG. 6 illustrates a simulation result indicating a relationship between an intensity of transmission light (refracted light and straight light) with respect to entering light when a Gaussian beam of circularly polarized light vertically enters a polarization splitter element of D=5 µm, and the number of sub regions. The wavelength of the beam in this case is 1.55 µm and the diameter is 5 µm. This graph shows that the photonic crystal type according to the present invention has better characteristics than a known metasurface type. FIG. 6(a) illustrates the intensity of refracted light which is desirably high. Consequently, even in a case of the same number of sub regions, the light intensity is improved by 0.2 to 0.3 dB. FIG. 6(b) illustrates the intensity of light which travels straight without being refracted, and is desirably low. Similarly, it is found that, even in a case of the same number of sub regions, the light intensity is improved by 3 to 7 dB. Furthermore, the photonic crystal type can achieve high definition, so that the number of sub regions can be increased compared to the metasurface type while the same width D is maintained. Superiority over the metasurface type includes that the number of sub regions can be increased more and, consequently, accuracy of the amplitude distribution and the phase distribution of transmission light are improved, and the phase gradually changes while the transmission light travels inside the photonic crystal having the thickness of approximately 10 wavelengths, so that phase discontinuity produced between the sub regions is suppressed.

Second Embodiment

[Curve Type]

The first embodiment has described superiority of a photonic crystal type polarization splitter element divided into sub regions. However, there is a fundamental problem that a phase error caused by dividing sub regions is inevitable. Furthermore, there is a problem that, when the number of sub regions is increased, sufficient anisotropy cannot be obtained in the sub regions, and retardance becomes little. Therefore, there is a problem that, when a period is shortened to obtain a large polarization splitting angle, the number of sub regions needs to be made smaller, and so a quantization error becomes great and polarization splitting characteristics deteriorate. The present embodiment will describe a method which can solve this problem.

An ideal angular distribution of an optical axis changes from 0 degree to 180 degrees in one period, and the change amount of the angular distribution is a distribution proportional to x. This ideal angular distribution can be realized by making a pattern (a protrusion part or a recess part) of photonic crystal a curve $(D/\pi) \times \log(\cos(\pi x/D))$ when x is between $-D/2$ and $D/2$. A tangential line of this curve is the angle of the optical axis, so that the ideal optical axis distribution can be obtained. The polarization splitter element having this axis azimuth direction will be referred to as a curve type.

FIG. 2 illustrates the present embodiment. The pattern (the protrusion part or the recess part) of the photonic crystal is curved, so that the pattern is sparse at a center part in one period, becomes denser toward the end and collapses. An inter-pattern pitch at the center part is used as a reference, and is $p_0$. Two patterns are joined at a position at which $p_0$ is a certain threshold pitch or less. Immediately after the patterns are joined, the inter-pattern pitch is 2 $p_0$, however, as the pattern is closer to the end, the pattern becomes denser, and therefore, when the inter-pattern pitch becomes a threshold length or less, the patterns are joined again. By repeating the above operation, it is possible to realize the ideal optical axis distribution while the pitch changes within a certain range. When the threshold pitch is 0.5 $p_0$, a pitch change range is between 0.5 $p_0$ and 2.0 $p_0$. That is, a neighboring protrusion part and recess part are geometrically disposed such that a ratio of a maximum value and a minimum value of an interval of first one of the neighboring protrusion part and recess part is four times or less, and second one of the neighboring protrusion part and recess part branches and joins. In the example in FIG. 2, white parts are recess parts, and black parts are protrusion parts.

Figure 3:
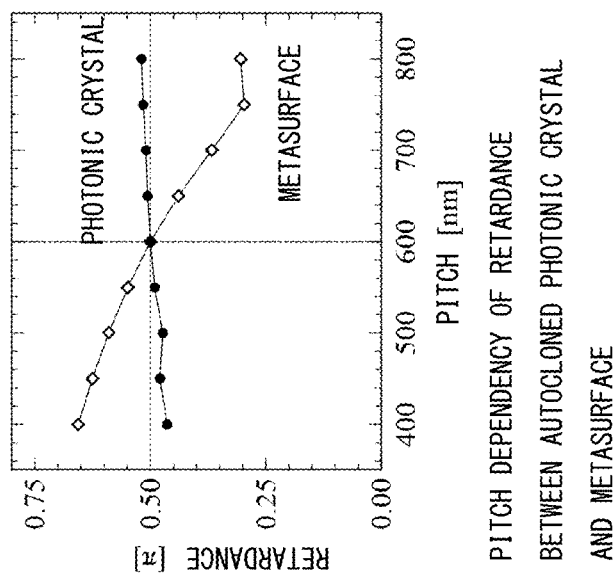
FIG. 3 illustrates a view illustrating sensitivity of a phase difference with respect to a pitch change in a case of photonic crystal.

As illustrated in FIG. 3, autocloned photonic crystal causes a little change in the effective refractive index with respect to a change in the pitch. That is, the change amount of retardance with respect to the change in the pitch is dull, and therefore the curve type is superior to the metasurface type. When, for example, the reference pitch $p_0$ which is preferable as a wavelength 1.55 μm band is 600 nm, a minimum pitch threshold is 0.65 $p_0$, and a maximum pitch threshold is 1.3 $p_0$, the pitch changes between 400 nm and 800 nm, and the change amount of retardance settles within ±10% and is very small.

Figure 7:
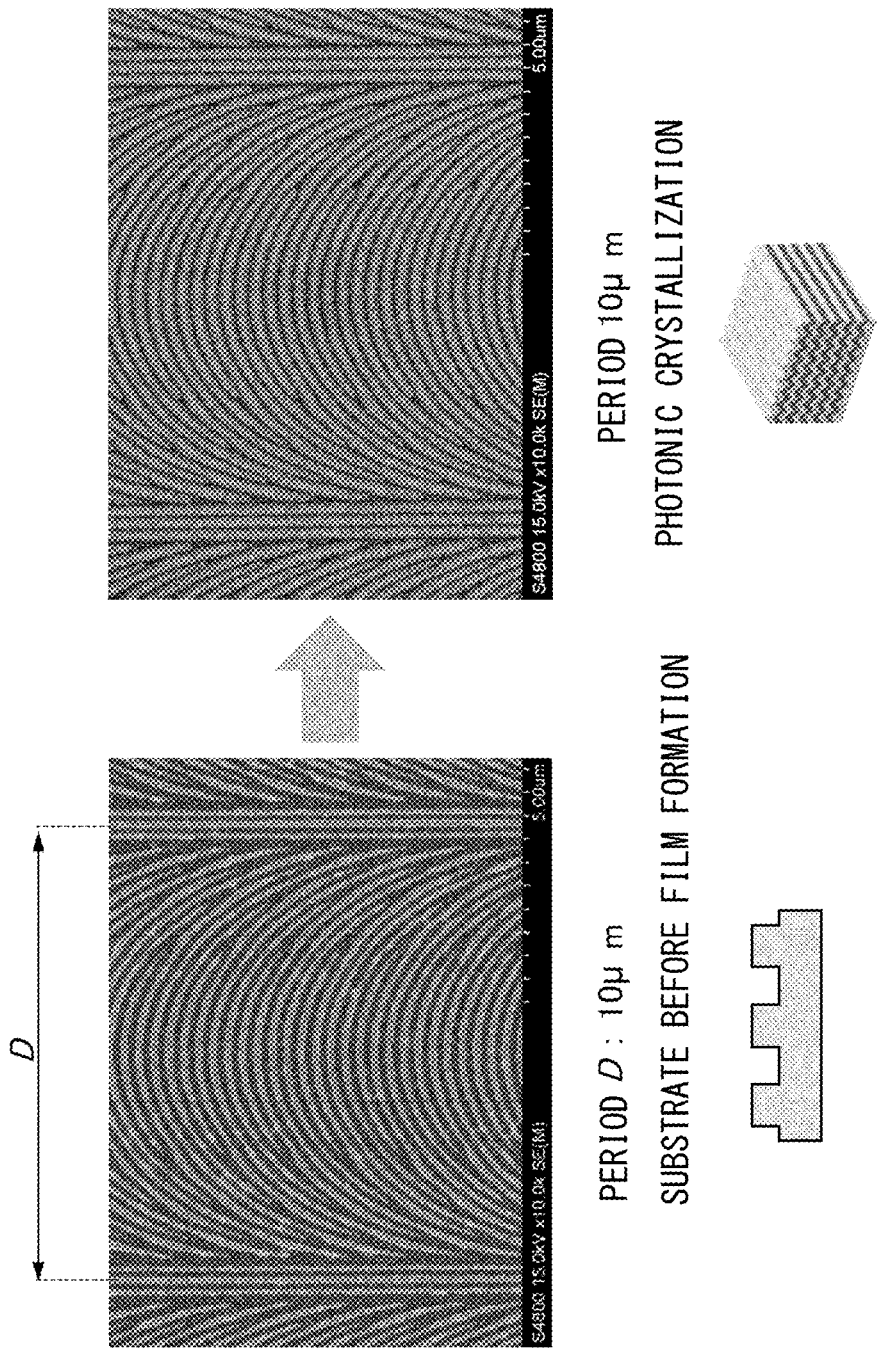
FIG. 7 illustrates an example of an optical element (curved type) according to a second embodiment.

FIG. 7 illustrates a quartz substrate before film formation, and a surface SEM image of the autocloned photonic crystal formed on the quartz substrate. The photonic crystal is designed for the wavelength 1.55 μm band, the reference pitch is 300 nm, and a photonic crystal material includes $Nb_2O_5$ and $SiO_2$. The threshold pitch for joining the patterns is 0.5 $p_0$. This SEM image shows that, by forming a curved pattern on the quartz substrate, the photonic crystal is formed along the pattern.

Figure 8:
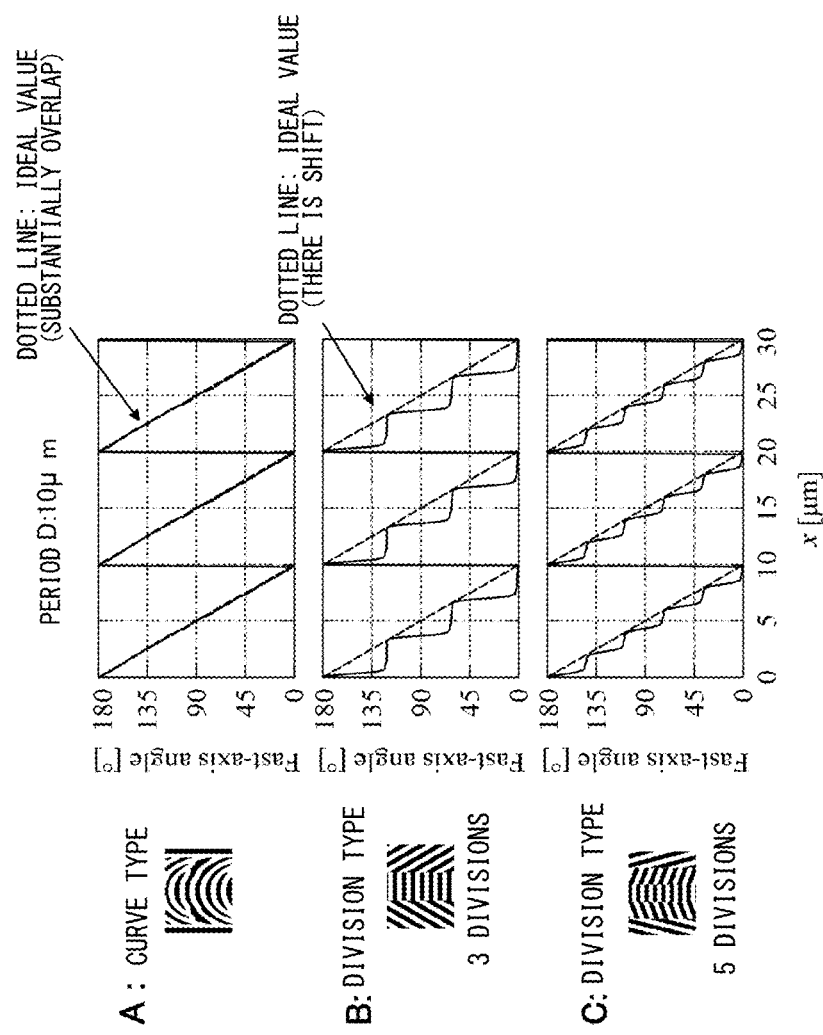
FIG. 8 illustrates a view illustrating actual measurement values of principal axis direction distributions of the optical element according to the first embodiment and the optical element according to the second embodiment.

FIG. 8 illustrates a measurement result of an optical axis azimuth direction of a photonic crystal form polarization splitter element. The wavelength used for measurement is 520 nm, and a design of the photonic crystal is changed in accordance with the measured wavelength. The reference pitch is 300 nm, the photonic crystal material includes $Nb_2O_5$ and $SiO_2$, and each film thickness is 40 nm. The films are stacked at 15 periods, and the thickness of the photonic crystal part is 1.2 μm in total. The threshold pitch for joining the patterns is 0.5 $p_0$. The period of the polarization splitter element is created as 6, 8 and 10 μm. Furthermore, a pattern divided into sub regions is also formed on the same substrate for comparison, and films are collectively formed on the pattern. This measurement result shows that a curve type element can realize an ideal axis azimuth direction distribution indicated by a dotted line. On the other hand, the measurement result shows that the division type changes the axis azimuth direction stepwise due to a quantization error.

Figure 9:
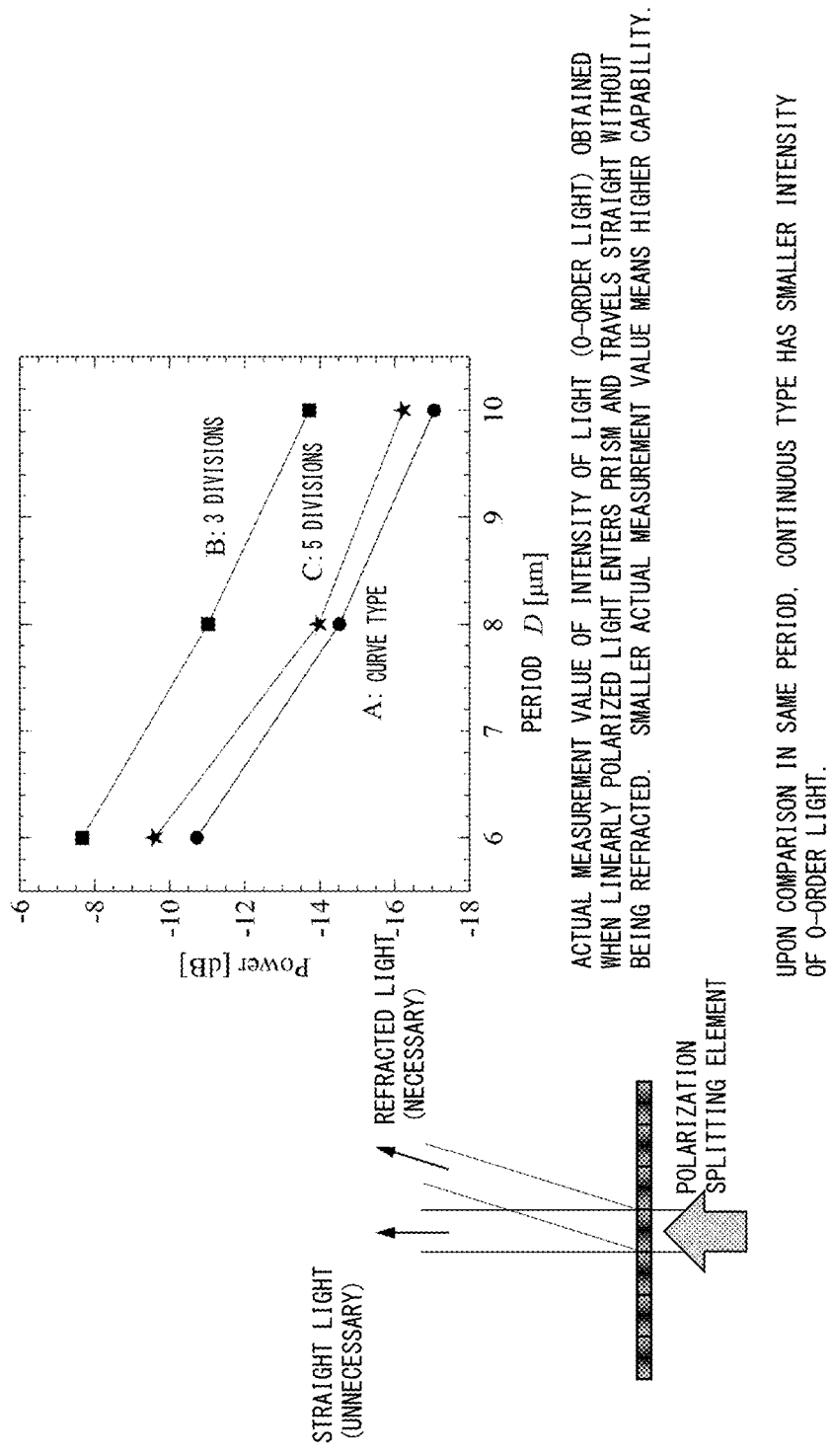
FIG. 9 illustrates a view illustrating actual measurement values of optical characteristics of the optical element according to the first embodiment and the optical element according to the second embodiment.

FIG. 9 illustrates measurement values of 0-order light (unnecessary light generated due to a phase error) of the division type and the curve type. This shows that the curve type can reduce unnecessary light. Consequently, it has been found that the curve type can be realized, and has higher capability than that of the division type.

Third Embodiment

[Three-Layer Structure]

The prisms according to the first embodiment and the second embodiment operate with respect to predetermined circularly polarized light, and output circularly polarized light, too. However, what is useful for a general optical system is linearly polarized light. (For example, according to optical communication, a unique state and a stable operation state of all of a laser light source, a PLC waveguide, an LN modulator and a silicon photonics element are realized by linearly polarized light.) The linearly polarized light and the circularly polarized light can be converted into each other when light passes a ¼ wavelength plate. Consequently, a three-part configuration of a ¼ wavelength plate, the prism in FIG. 7 and a ¼ wavelength plate can obtain a prism of a linearly polarized light input and a linearly polarized light output, and provides a high use value.

An autocloned photonic crystal technique can form a uniform ¼ wavelength plate on a flat substrate, form a curve type photonic crystal form ½ wavelength plate having the principal axis azimuth direction distribution, on the ¼ wavelength plate as described in the second embodiment, and further form the uniform ¼ wavelength plate on the ½ wavelength plate (Surface planarization needs to be performed in the middle, yet can be executed by spattering in the same device).

More specifically, (1-1) a uniform groove column is formed on a substrate by such as a nano imprint method, (1-2) a uniform ¼ wavelength plate is formed on the groove column by the autocloning method, (1-3) the surface of the ¼ wavelength plate is planarized by such as a spattering method, (2-1) a desired pattern is formed by such as the nano imprint method on the ¼ wavelength plate, (2-2) a ½ wavelength plate of the curve type described in the second embodiment and having a principal axis azimuth direction distribution is formed on the desired pattern by such as the autocloning method, (2-3) the surface of the ½ wavelength plate is planarized by such as the spattering method, (3-1) a uniform groove column is formed on the ½ wavelength by such as the nano imprint method, and (3-2) a uniform ¼ wavelength plate is formed on the groove column by the autocloning method in this order.

The polarization splitter element of the three-layer structure will be described below with reference to FIG. 10. A uniform first ¼ wavelength plate 1003 made of the autocloned photonic crystal is formed on a substrate 1004. A ½ wavelength plate 1002 described in the second embodiment, having the principal axis azimuth direction distribution and made of the curve type autocloned photonic crystal type photonic crystal is formed on the first ¼ wavelength plate

1003. In addition, the ½ wavelength plate 1002 can be also replaced with the division type autocloned photonic crystal described in the first embodiment and having the principal axis azimuth direction distribution. A uniform second ¼ wavelength plate 1001 made of the autocloned photonic crystal is formed on the ½ wavelength plate 1002. Regarding linearly polarized light 1005, the linearly polarized light 1005 having entered the principal axis of the first ¼ wavelength plate 1003 from the azimuth direction of 45 degrees is converted into left-handed circularly polarized light 1006. The left-handed circularly polarized light 1006 is converted into right-handed circularly polarized light 1007 by the ½ wavelength plate 1002 whose principal axis azimuth direction is distributed in the plane, and an equiphase surface inclines. As a result, a traveling direction of the right-handed circularly polarized light 1007 inclines, and the right-handed circularly polarized light 1007 enters the uniform second ¼ wavelength plate 1001, and is emitted as linearly polarized light 1008. In this case, by changing the principal axis azimuth directions of the uniform first ¼ wavelength plate 1003 and the second ¼ wavelength plate 1001 on an entrance side and an emission side by 90°, it is possible to make the azimuth directions of the entering linearly polarized light 1005 and the emitted linearly polarized light 1008 the same.

Figure 10:
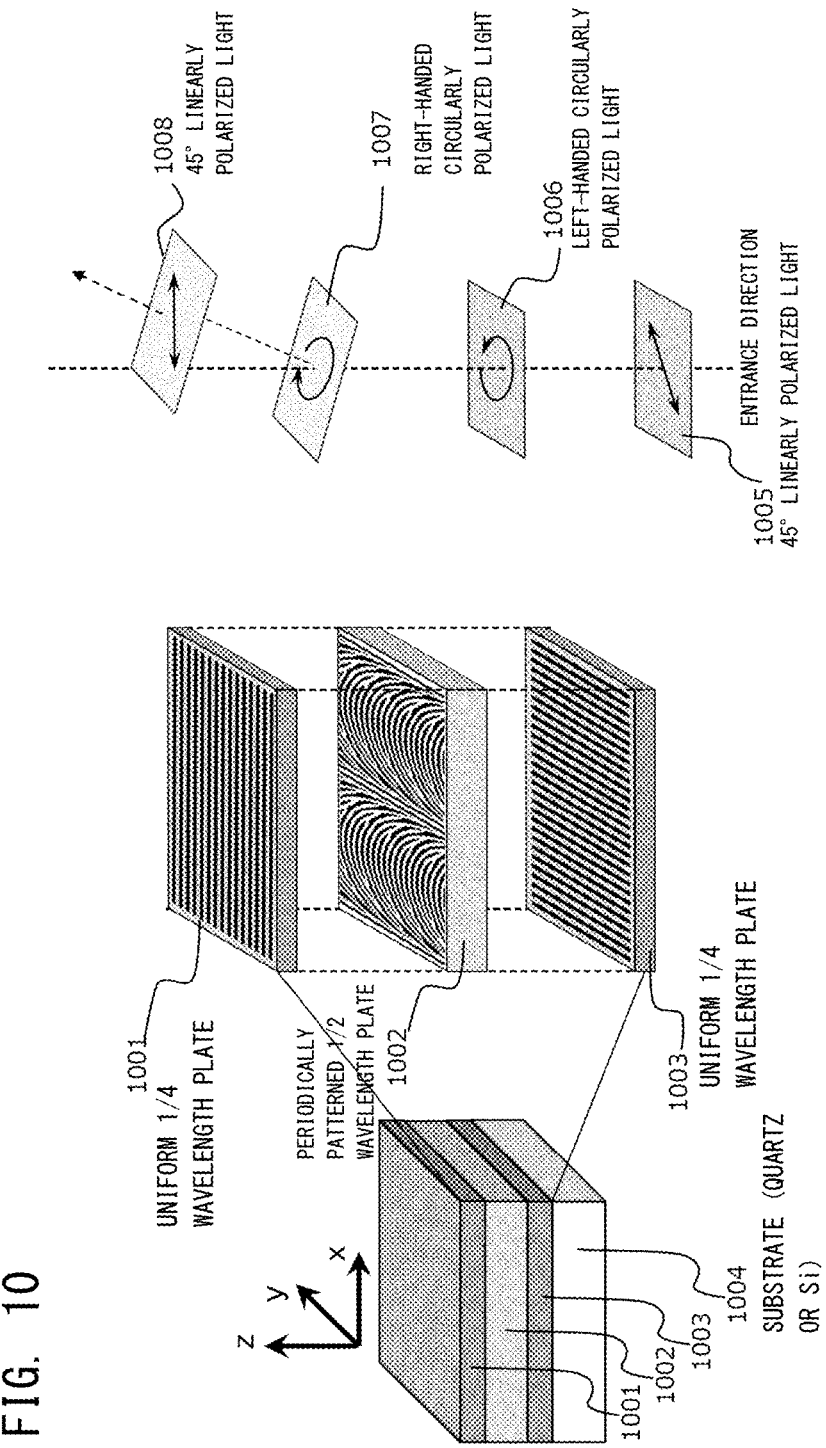
FIG. 10 illustrates a view illustrating an optical element according to a third embodiment and illustrates that 45-degree linearly polarized light enters.
Figure 11:
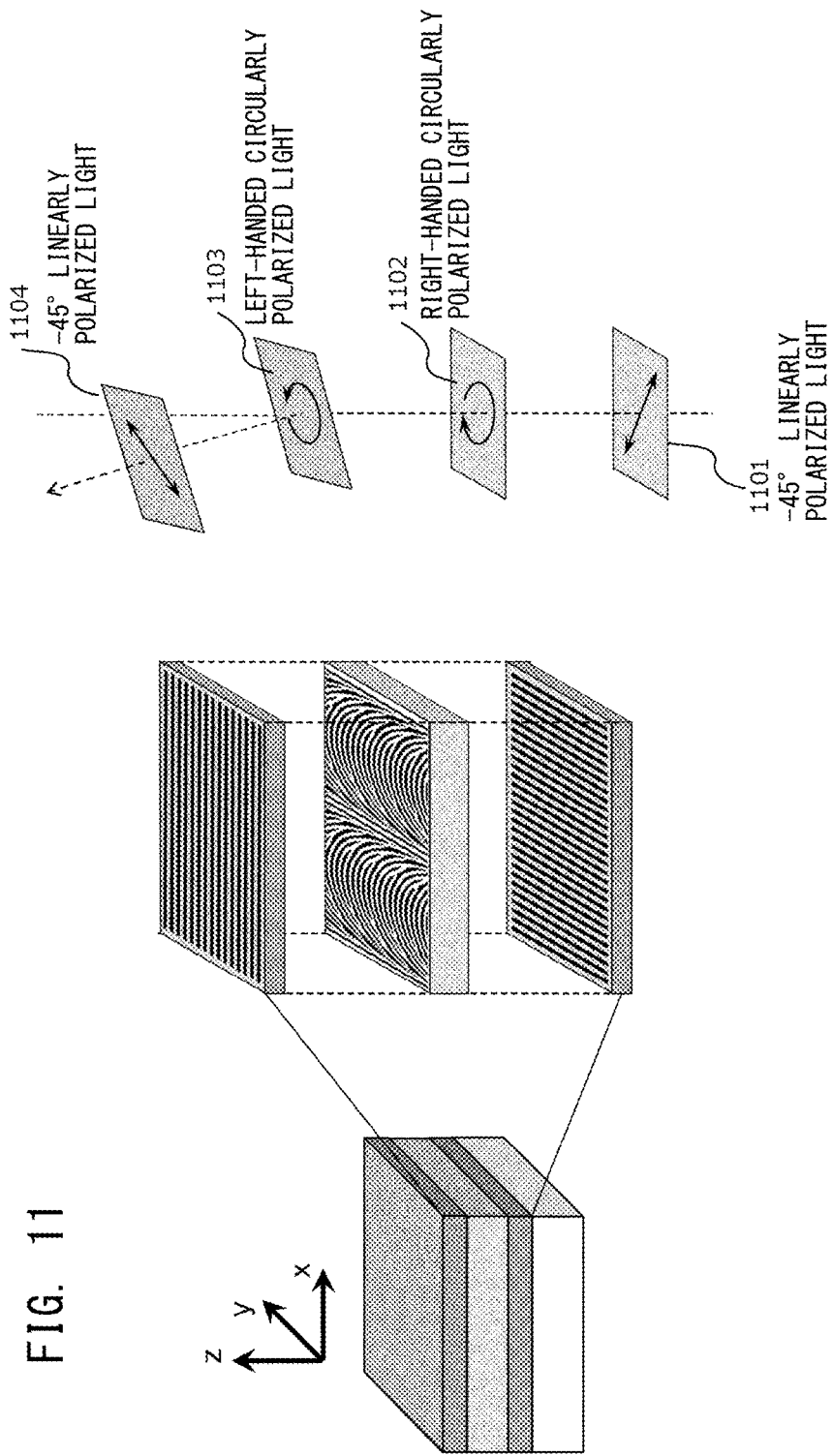
FIG. 11 illustrates a view illustrating the optical element according to the third embodiment, and illustrates that −45-degree linearly polarized light enters.

Next, FIG. 11 illustrates that azimuth directions of entering linearly polarized light 1101 and the entering linearly polarized light 1005 in FIG. 10 differ by 90°. The linearly polarized light 1101 enters the uniform first ¼ wavelength plate, is converted into right-handed circularly polarized light 1102, and is converted into left-handed circularly polarized light 1103 by the ½ wavelength plate whose principal axis azimuth direction is distributed in the plane, and the equiphase surface inclines opposite to that in FIG. 10. As a result, the traveling direction inclines, and the left-handed circularly polarized light 1103 enters the uniform second ¼ wavelength plate and is emitted as linearly polarized light 1104.

Figure 12:
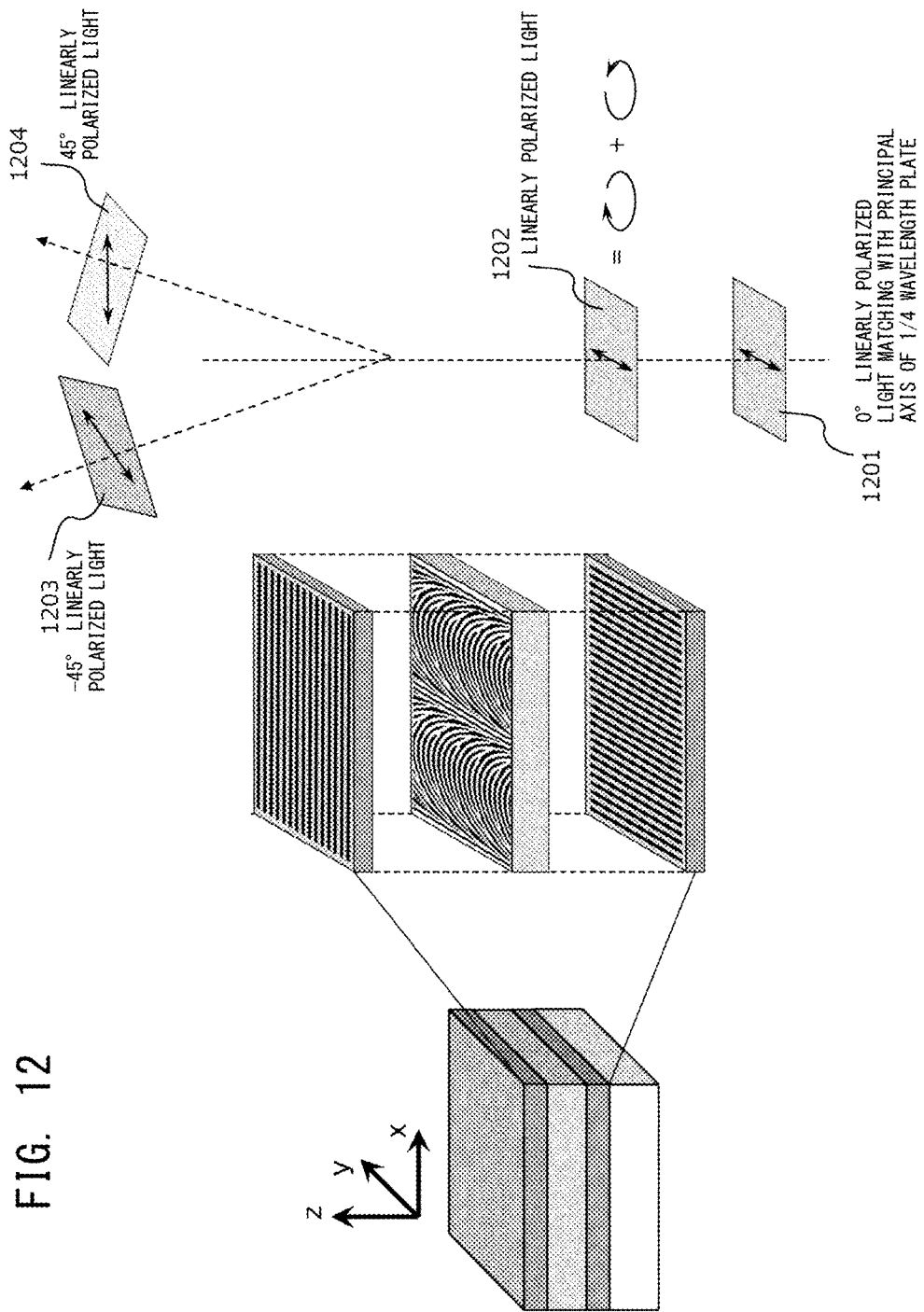
FIG. 12 illustrates a view illustrating the optical element according to the third embodiment, and illustrates that 0-degree linearly polarized light enters.

Next, FIG. 12 illustrates that entering linearly polarized light 1201 enters in the same azimuth direction as that of the principal axis of the uniform first ¼ wavelength plate. The linearly polarized light 1201 enters the uniform first ¼ wavelength plate, and is emitted as linearly polarized light 1202. The linearly polarized light 1202 can be regarded as what right-handed circularly polarized light and left-handed circularly polarized light, having the same amplitude, are synthesized, and can be decomposed. The traveling directions of the decomposed right-handed circularly polarized light and left-handed circularly polarized light are inclined by the ½ wavelength plate whose principal axis azimuth direction is distributed in the plane as illustrated in FIGS. 10 and 11, and the decomposed right-handed circularly polarized light and left-handed circularly polarized light are split into two beams of linearly polarized light like beams of linearly polarized light 1203 and 1204 whose azimuth directions differ by 90°. In this case, the beams of the linearly polarized light 1203 and 1204 have the same light intensity.

Figure 13:
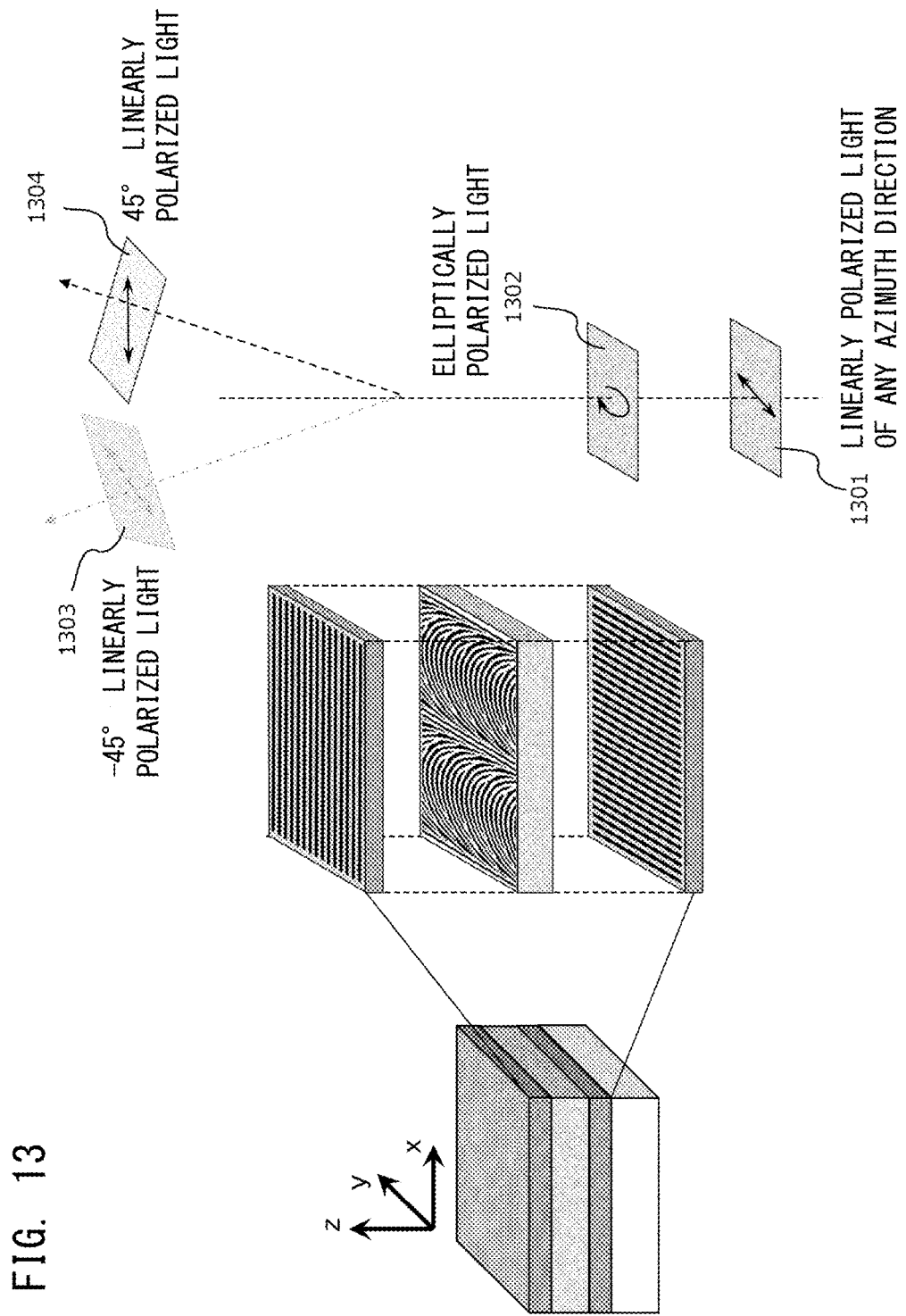
FIG. 13 illustrates a view illustrating the optical element according to the third embodiment, and illustrates that linearly polarized light of any azimuth direction enters.

Next, FIG. 13 illustrates that linearly polarized light 1301 of an arbitrary azimuth direction enters. The linearly polarized light 1301 of an arbitrary azimuth direction enters the uniform first ¼ wavelength plate, and is converted into elliptically polarized light 1302. The elliptically polarized light 1302 can be regarded as what right-handed circularly polarized light and left-handed circularly polarized light, having different amplitudes, are synthesized, and can be decomposed. The traveling directions of the decomposed right-handed circularly polarized light and left-handed circularly polarized light are inclined by the ½ wavelength plate whose principal axis azimuth direction is distributed in the plane as illustrated in FIGS. 10 and 11, and the decomposed right-handed circularly polarized light and left-handed circularly polarized light are split into two beams of linearly polarized light like beams of linearly polarized light 1303 and 1304 whose azimuth directions differ by 90°. In this case, a balance between the light intensities of the beams of the linearly polarized light 1303 and 1304 changes according to the azimuth direction of the linearly polarized light 1301. (+45° component, −45° component)

Thus, the entering linearly polarized light is polarized and split by the curve type polarization splitter element (polarization grating) which uses autocloned photonic crystal.

The entering polarized light is polarized and split to linearly polarized light of each component similarly in a case of elliptically polarized light.

In this regard, the curve type is used for a polarization splitting part, and the operation is possible even when the division type is used. In this case, a phase error to be produced is greater than that of the curve type.

Fourth Embodiment

[Lensed Prism]

By combining the curve type polarization splitter element according to the second embodiment, the ¼ wavelength plate and a lens, it is possible to condense a desired polarized light component while removing an unnecessary polarized light component. In addition, the polarization splitter element can be also replaced with a division type polarization splitter element.

Figure 14:
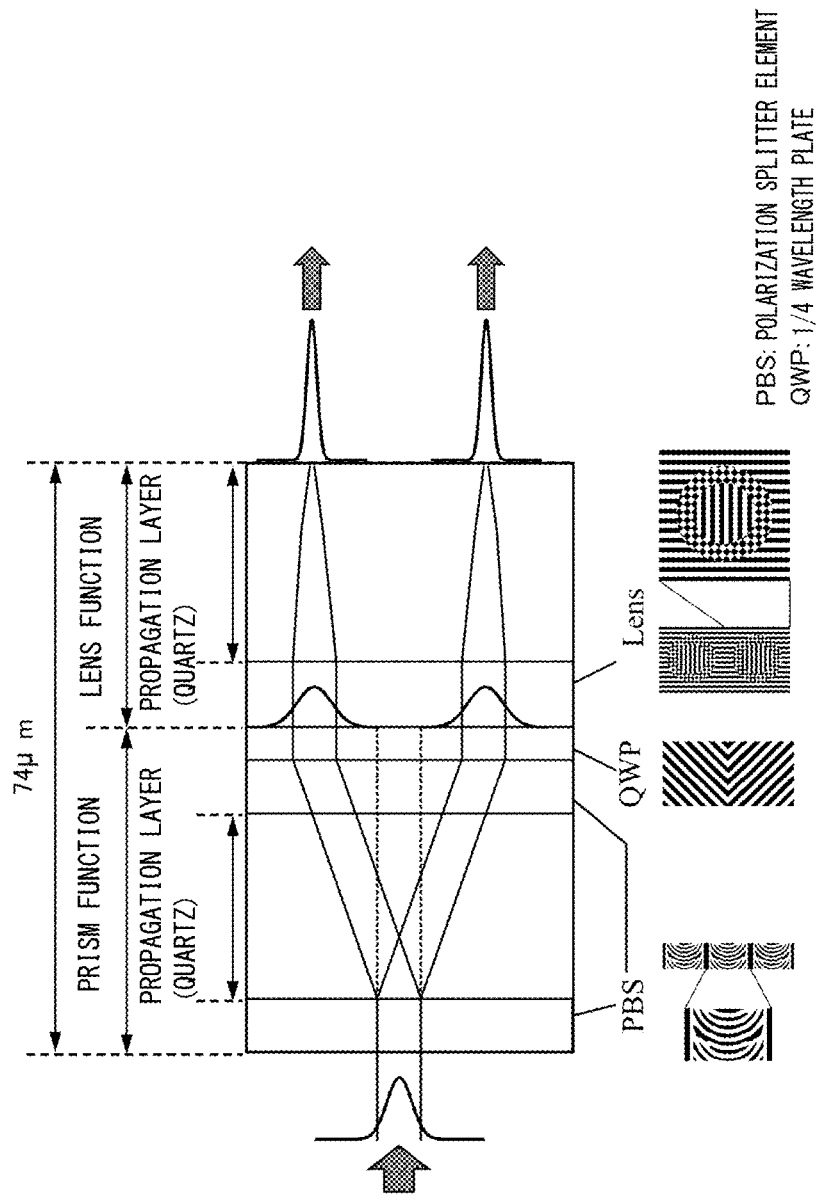
FIG. 14 illustrates a view illustrating an example of a composite optical element according to a fourth embodiment.

Light which enters as in FIG. 14 is split into right-handed circularly polarized light and left-handed circularly polarized light by the polarization splitter element according to the second embodiment, and propagates in an oblique direction. The right-handed circularly polarized light and the left-handed circularly polarized light propagate in a quartz layer, and are converted to propagate in parallel by a second polarization splitter element disposed such that circularly polarized light to be split is opposite to that of a first polarization splitter element. Then, the right-handed circularly polarized light and the left-handed circularly polarized light are converted into beams of linearly polarized light (vertically polarized light or horizontally polarized light) having a polarization major axis in the same direction by a region division type ¼ wavelength plate whose axis azimuth direction is changed by 90 degrees. Then, the linearly polarized light is condensed by a photonic crystal lens respectively. In this case, when unnecessary polarized light whose polarized light major axis direction differs by 90 degrees from condensed light exists as a crosstalk, this polarized light is not condensed, so that it is possible to improve the polarized light crosstalk and polarized light purity of output light.

A prism function part will be described below by using specific parameters.

Calculation conditions are as follows.
Wavelength 1.55 μm
entering light Gaussian beam of radius 2.5 μm (a beam radius of a commonly available high refractive index difference single mode optical fiber)
Right-handed circularly polarized light
Material (PBS and QWP) a-Si/SiO2
PBS period 3 μm
PBS thickness 3.4 μm QWP thickness 1.7 µm
Quartz thickness 50 µm
As a result of BPM analysis,
Output light radius 3.68 µm
Curvature radius of wavefront 25.4 µm
Beam split width 8.2 µm
have been obtained.

Next, the lens function part will be described. Analysis has been performed by using the beam parameters obtained by the above analysis as entrance conditions. A left view of FIG. 15 illustrates the outline of the lens.
Lens thickness 4.8 µm
Radii at which a pattern is switched
2.6 µm and 3.61 µm
Effective refractive indices are
2.713, 2.600, and 2.486
from a center part. Light is condensed in a quartz propagation layer, and estimated loss which assumes a silicon photonics device in a right view of FIG. 15 is performed. In one example, when a connection destination device has a mode field which is 1.5 µm in radius, connection loss of the lensed prism is estimated as approximately 0.95 dB.

As described above, polarization and splitting, and condensation can be realized by a thin composite optical element which is 74 µm in this example. This composite optical element can be miniaturized incomparably, compared to an optical element which uses a quartz planar optical waveguide (which is a PLC and whose channel length is several 10 mm), for polarization and splitting between an optical fiber and the silicon photonics.

In this regard, the curve type is used for a polarization splitting part, and the operation is possible even when the sub region type is used. In this case, a phase error to be produced is greater than that of the curve type.

Furthermore, all of the polarization splitter element, the ¼ wavelength plate and the lens which form the lensed prism (composite optical element) are preferably formed by the photonic crystal. The photonic crystal type polarization splitter element may be any one of the division type according to the first embodiment and the curve type according to the second embodiment described above. Furthermore, the photonic crystal type ¼ wavelength plate is known. A normal lens can be also used as the lens, however, by using a photonic crystal type lens, it is possible to make the thickness in a light propagation direction thin.

As illustrated in FIG. 15, the photonic crystal type lens has an x axis and a y axis of a three-dimensional space x, y and z as principal axes of birefringence, and includes at least one surrounding part which overlaps a columnar center part which extends in a z direction and surrounds the center part. The center part and the surrounding part are autocloned photonic crystal. The center part has a higher effective refractive index than that of the surrounding part. A boundary between the center part and the surrounding part is circular or square. The photonic crystal type lens can guide light having an electric field in the x or y direction to the z direction, and converts a spot size of the guided propagation light. Furthermore, the surrounding part may include a first surrounding part which surrounds the center part, and a second surrounding part which surrounds the first surrounding part and has a lower effective refractive index than that of the first surrounding part. Thus, stacked aggregates of three-dimensional photonic crystal micro wavelength plates can function as a vertical optical waveguide, and provide an optical element which condenses, diffuses and refracts linearly polarized light. Consequently, it is possible to further enhance a light-harvesting property of a thin flat photonic crystal lens, achieve further miniaturization and provide a high light harvesting function.

Furthermore, the radius of the center part or a value which is half the length in a longitudinal direction of the center part on an xy plane in the photonic crystal type lens is preferably 10 times or less than the wavelength of propagating light. Furthermore, a stepwise refractive index distribution preferably approximates a quadratic paraboloid $n=q-p(x^2+y^2)$ within a range of a high light intensity on the xy plane.

INDUSTRIAL APPLICABILITY

The lens and the prism are the base of the optical technique, and have a use value in every field. For example, in terms of optical communication,
while the lens is an important optical element used for a part which guides light of a laser light source to fibers and a planar light circuit (PLC) or a part which couples light in the planar light circuit (PLC) to a modulator or a switch,
the prism is an important optical element used for a part which splits two types of linearly polarized light (e.g., whether the field is parallel or vertical to a reference plane) propagating to the fibers or an optical circuit, and a part which bundles the two types of linearly polarized light into one channel (optical fiber) to the contrary.

Furthermore, when a circuit having polarization dependency is used, these optical elements are used for a polarization diversity and optical coupling module which splits polarized light into two components, and adjusts the respective beams of light to diameters of the desired optical beams and a predetermined polarization direction to input to the two same circuits.

In addition, a light propagation direction is reversible, so that, for example, a polarization splitting prism in FIG. 13 can be used in a reverse direction to use for a polarization synthesizing prism. The lensed prism in FIG. 14 can cause predetermined linearly polarized light to enter from two ports at a right end, and obtain an output synthesized at a left end.

Consequently, the first, second, third and fourth embodiments are both polarization splitter elements and polarization synthesizing elements in this respect. Every embodiment can be industrially used.

The invention claimed is:
1. An optical element comprising a half wavelength plate of photonic crystal which is formed on an xy plane and in which two types of transparent media with different refractive indices are stacked alternately, each over multiple layers, in a three-dimensional space x, y and z, wherein
the optical element includes one or a plurality of single or repeated regions in an x axis direction,
the regions are partitioned into a plurality of sub regions of belt-like shapes in the x axis direction,
in a groove direction of the photonic crystal comprising protrusion parts and recess parts,
an angle with respect to a y axis direction changes stepwise in a range of 0° to 180° in the region, and
the angle with respect to the y axis direction is uniform in the sub region, and
the optical element splits and converts light entering in the z axis direction into
right-handed circularly polarized light in a direction which travels toward an x axis by a certain angle from a z axis, and
left-handed circularly polarized light in a direction which travels toward an x axis by the same angle from the z axis to emit.

2. An optical element comprising a half wavelength plate of photonic crystal which is formed on an xy plane and in which two types of transparent media with different refractive indices are stacked alternately, each over multiple layers, in a three-dimensional space x, y and z, wherein the optical element includes one or a plurality of single or repeated regions in an x axis direction, a groove direction of the photonic crystal comprising protrusion parts and recess parts
is a curve, and
an angle with respect to a y axis direction continuously changes within a range of 0° to 180°, and the optical element splits and converts light entering in the z axis direction into right-handed circularly polarized light in a direction which travels toward an x axis by a certain angle from a z axis, and left-handed circularly polarized light in a direction which travels toward an x axis by the same angle from the z axis to emit.

3. The optical element according to claim 2, wherein where a pitch of a pattern consisting of the protrusion parts and the recess parts in a center part of the regions is $p_0$, at edge parts of the regions, the protrusion parts and the recess parts are joined so that a pitch of a pattern consisting of the protrusion parts and the recess parts in the edge parts is in a variation range of 0.5 $p_0$ to 2.0 $p_0$.

4. The optical element according to claim 3, wherein, when a width of the region is D,
the curve is expressed by $y=(D/\pi)\log(\cos(\pi x/D))+$ a constant.

5. The optical element according to claim 1 or 2, wherein
an inter-groove unit period of the photonic crystal is 40 nm or more and is ¼ or less than a wavelength of the entering light, and
a period in a thickness direction is ¼ or less than the wavelength of the entering light.

6. The optical element according to claim 1 or 2, wherein
a ¼ wavelength plate made of the photonic crystal is stacked or disposed on a single surface or both surfaces, and
light entering from the z axis direction of the optical element is split into two beams of orthogonal linearly polarized light.

7. A composite optical element comprising two optical elements according to claim 1 or two optical elements according to claim 2, wherein a first optical element and a second optical element are disposed at an interval of a certain propagation length, the composite optical element comprises:

a ¼ wavelength plate which is provided at a stage subsequent to the second optical element; and a pair of lenses which are provided at the stage subsequent to the ¼ wavelength plate, and have a function of condensing linearly polarized light and diffusing linearly polarized light orthogonal to the linearly polarized light, and splits light entering from a side of the first optical element into two linearly polarized light components to condense.

* * * * *